United States Patent [19]

Ohhara et al.

[11] Patent Number: 4,568,989
[45] Date of Patent: Feb. 4, 1986

[54] MODE CHANGING APPARATUS FOR A TAPE RECORDER

[75] Inventors: Kenji Ohhara, Chiba; Yoshinori Yamamoto, Kanagawa; Masao Ri, Tokyo; Hisanori Watanabe, Kanagawa; Yasuo Osada, Tokyo, all of Japan

[73] Assignee: Sony Corporation, Tokyo, Japan

[21] Appl. No.: 433,643

[22] Filed: Oct. 12, 1982

[30] Foreign Application Priority Data

Oct. 21, 1981 [JP] Japan .................................. 56-168075

[51] Int. Cl.$^4$ .......................... G11B 15/00; G11B 5/54
[52] U.S. Cl. ...................................... 360/90; 360/105
[58] Field of Search ............................ 360/90-93, 360/105, 137, 96.6, 106, 74.1

[56] References Cited

U.S. PATENT DOCUMENTS 3,976,263 8/1976 Suzuki .
4,167,764 9/1979 Hamajima .

Primary Examiner—A. J. Heinz
Attorney, Agent, or Firm—Lewis H. Eslinger; Alvin Sinderbrand

[57] ABSTRACT

A mode changing apparatus for a tape recorder comprises a rotatable changing gear having a toothed periphery with a toothless gap therein, a magnet rotatably coupled with the changing gear for rotation therewith, a driving gear rotatably mounted for engagement with the toothed periphery of the changing gear, a yoke assembly including a portion cooperating with the magnet for providing a stabilizing effect by which the changing gear is held in an initial position with the toothless gap facing the driving gear, a solenoid coil wound on another portion of the yoke assembly and being operative, when energized, to generate a magnetic force by which the magnet and changing gear are angularly displaced from the initial position for engagement of the toothed periphery by the driving gear to cause turning of the changing gear, an operating member, such as a head base plate of the tape recorder, movable from an inactive position to an active position for establishing a respective mode of the tape recorder and being yieldably urged to return to its inactive position, an actuating assembly, desirably in the form of a cam rotatable with the changing gear and an actuating lever engageable with the cam and with the head base plate or other operating member, and being responsive to turning of the changing gear by the driving gear for moving the operating member to its active position, and an armature assembly moved from a free position spaced from the yoke assembly to a holding position against a portion of the latter in response to movement of the operating member to its active position, the yoke assembly and solenoid coil being operative, when the coil is energized, to magnetically hold the armature assembly in its holding position for preventing return of the operating member to its inactive position.

14 Claims, 5 Drawing Figures

MODE CHANGING APPARATUS FOR A TAPE RECORDER

BACKGROUND OF THE INVENTION

1. Field of the Invention

This invention relates to a mode changing apparatus for a tape recorder, and more particularly is directed to improvements in a mode changing apparatus of the feather-touch push-button type.

2. Description of the Prior Art

In a tape recorder having a conventional mode changing apparatus of the feather-touch, push-button type, an electromagnet is employed for establishing each of the selected modes of operation, for example, for moving a head base plate or carriage from an inactive position to an active position in which the tape is engaged by a head or heads on the base plate and/or for displacement of a pinch roller to an operative position against an associated capstan for driving the tape therebetween during a recording or reproducing operation. Such electromagnet requires a current supply thereto during the entire recording or reproducing operation, that is, upon interruption of the current supply to the electromagnet, the head base plate or carriage is returned by a spring to its inactive position for spacing the head or heads from the tape and/or for separating the pinch roller from the capstan. Further, the electromagnet used in such conventional mode changing apparatus needs to be relatively large for maintaining the head base plate in its active position against the force of the return spring and, accordingly, such electromagnet imposes a disadvantageously large current drain which is not suited for a battery-powered tape recorder.

In order to avoid the foregoing problem, it has been proposed to provide a mode changing apparatus with an electromagnet which is only momentarily energized to effect a triggering action by which the torque of an electric motor is transmitted to a mechanism for changing the operating mode. In this last mentioned mode changing apparatus, the electromagnet is not energized during the entire recording or reproducing operation, thereby to minimize the current drain resulting therefrom. However, there is usually included an additional locking mechanism for securing the operating mode changing mechanism in the condition characteristic of the selected operating mode, whereby the structure is undesirably complex. Furthermore, the mentioned locking mechanism cannot be electrically released so that problems are encountered in resetting the mode changing apparatus, particularly by remote operation thereof.

OBJECTS AND SUMMARY OF THE INVENTION

Accordingly, it is an object of this invention to provide a mode changing apparatus for a tape recorder which avoids the foregoing problems associated with the prior art.

More specifically, it is an object of this invention to provide a mode changing apparatus for a tape recorder which consumes relatively little electric power and therefore is suitable for use in a portable or battery powered tape recorder.

It is another object of the invention to provide a mode changing apparatus, as aforesaid, which is of relatively simple construction.

A further object of this invention is to provide a mode changing apparatus, as aforesaid, which employs a relatively small-sized electromagnetic assembly for triggering the operation of the mode changing apparatus by an electric motor, for example, in response to actuation of a switch of the feather-touch, push-button type and in which the electromagnetic assembly further functions to hold or lock the mode changing apparatus in its active condition for selecting the respective operating mode.

In accordance with an aspect of this invention, a mode changing apparatus is provided with a rotatable changing gear having a toothed periphery with a toothless gap therein, a magnet rotatably coupled with the changing gear for rotation with the latter, a driving gear rotatably mounted adjacent the changing gear and being engageable with the toothed periphery for driving the changing gear in response to operation of an electric motor coupled with the driving gear, yoke means including one portion cooperating with the magnet in an initial position of the changing gear for providing a stabilizing effect by which the changing gear is held in its initial position with the toothless gap facing the driving gear for avoiding engagement of the latter with the toothed periphery, a solenoid coil wound on another portion of the yoke means and being operative, when energized, to generate a magnetic force by which the magnet and changing gear are angularly displaced from said initial position for engagement of the toothed periphery by the rotated driving gear to cause turning of the changing gear, an operating member, such as, a head base plate or carriage of the tape recorder, movable from an inactive position to an active position for establishing a respective mode of the tape recorder, yieldable means urging the operating member to return from the active position to its inactive position, actuating means, for example, in the form of a cam rotatable with the changing gear and engageable by an actuating lever which, in turn, engages the operating member, for moving the operating member from said inactive position to said active position in response to turning of the changing gear by said engagement of the toothed periphery with the driving gear, and armature means moved from a free position spaced from said yoke means to a holding position against the latter in response to movement of the operating member from said inactive position to said active position, said yoke means and solenoid coil being operative, when the latter is energized, to magnetically hold said armature means in said holding position at which the operating member is held or locked against return by the yieldable means from the active position to the inactive position.

In a preferred embodiment of the invention, the yoke means includes a first substantially U-shaped portion defining a first magnetic path for generation of the magnetic force by which the magnet and changing gear are angularly displaced from the initial position upon energizing of the solenoid coil, and a second substantially U-shaped portion defining a second magnetic path having a magnetic resistance greater than that of the first magnetic path when the armature means is in its free position and against which said armature means is held in the holding position of the latter to convert the second magnetic path to a closed path of low magnetic resistance.

The above, and other objects, features and advantages of the invention, will be apparent from the following detailed description of illustrative embodiments thereof which is to be read in conjunction with the accompanying drawings in which the same reference numerals are employed to identify corresponding parts in the several views.

DETAILED DESCRIPTION OF THE PREFERRED EMBODIMENTS

Figure 1:
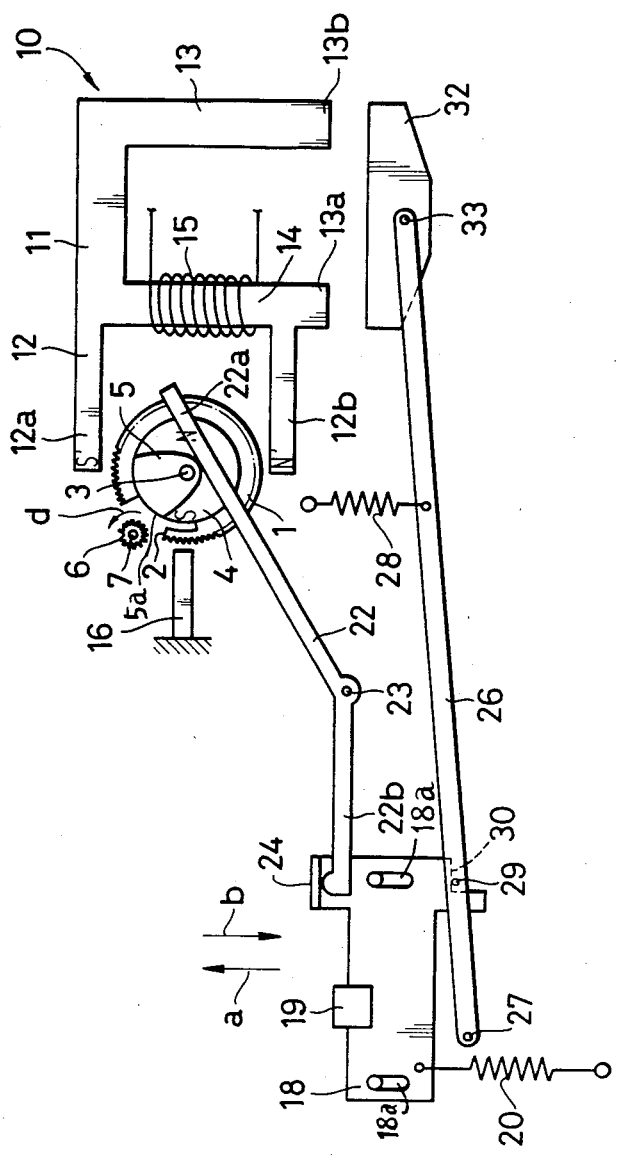
FIG. 1 is a schematic plan view of a mode changing apparatus according to an embodiment of this invention, and which is shown in an inactive position or condition corresponding to a STOP mode of an associated tape recorder.

Referring to the drawings in detail, and initially to FIG. 1 thereof, it will be seen that a mode changing apparatus for a tape recorder in accordance with an embodiment of this invention is there illustrated schematically to comprise a changing gear 1 having a toothed periphery with a toothless gap 2 therein. The changing gear 1 is rotatable on a suitably mounted shaft 3 which also carries a permanent magnet 4 and a cam 5 rotatably coupled with changing gear 1. The magnet 4 is shown to have oppositely magnetized or north and south poles N and S which are substantially diametrically opposed to each other, that is, angularly displaced from each other by approximately 180° about the axis of shaft 3. Cam 5 is shown to be substantially sector-shaped so as to present a radially high surface 5a having an angular extent of, for example, about 60°. A driving gear 6 is mounted on a rotatable shaft 7 of an electric drive motor (not shown) and is disposed adjacent changing gear 1 so as to be engageable with the toothed periphery of the latter, as on FIGS. 2 and 3, for driving the changing gear.

The mode changing apparatus according to the invention is further shown to generally comprise an electromagnetic assembly 10 including a yoke or core 11 having a first substantially U-shaped portion 12 defining a first magnetic path, a second U-shaped portion 13 extending substantially at right angles to the first U-shaped portion 12 and being formed integrally with the latter so as to have a yoke portion 14 in common therewith. The second U-shaped yoke portion 13 defines a second magnetic path which, considering only the yoke 11, has a magnetic resistance greater than that of the first magnetic path defined by U-shaped yoke portion 12. The difference between the magnetic resistances of the first and second magnetic paths may be caused by differences between the materials of which the yoke portions 12 and 13 are respectively formed, or by differences between the cross-sectional areas of such yoke portions 12 and 13. A solenoid coil 15 is wound around the common portion 14 of the U-shaped yoke portions 12 and 13 and is adapted to be selectively energized from a suitable voltage source 8, as shown on FIGS. 2, 3 and 4. The yoke 11 is positioned, as shown on FIG. 1, so that the ends 12a and 12b of first U-shaped yoke portion 12 extend above and below, respectively, and are adjacent to magnet 4 on shaft 3.

In the embodiment of the invention shown on FIGS. 1–4, there is further provided a stabilizing yoke portion 16 extending adjacent magnet 4 at a position intermediate ends 12a and 12b of yoke portion 12. As hereinafter described in detail, yoke portion 16 cooperates with magnet 4 to provide a stabilizing effect by which changing gear 1 is normally held in its initial position shown on FIG. 1 and in which the toothless gap 2 faces driving gear 6 for normally avoiding engagement of the driving gear with the toothed periphery of changing gear 1.

Figure 2:
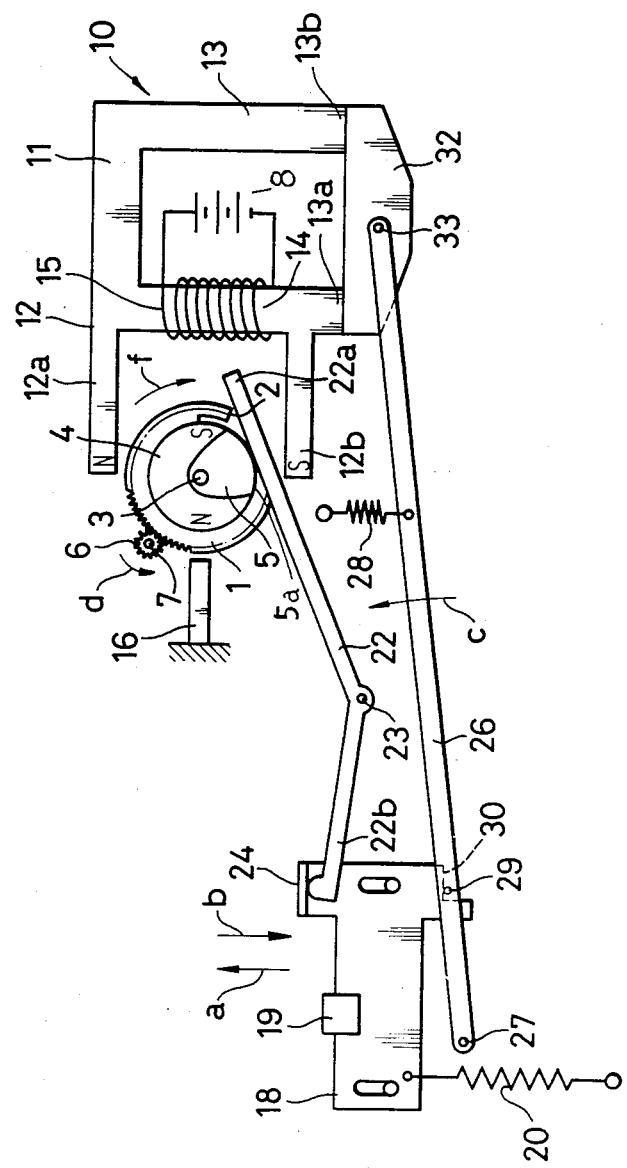
FIG. 2 is a view similar to that of FIG. 1, but showing the mode changing apparatus in the course of its operation for changing-over the associated tape recorder from the STOP mode to a FORWARD mode for a recording or reproducing operation.

An operating member 18 which, in the illustrated embodiment of the invention, is represented as a head base plate or carriage, is mounted, as by pin and slot connections 18a, for movement in the reciprocal directions of the arrows a and b between an inactive position (FIG. 1) and an active position (FIG. 2). A magnetic recording and/or reproducing head 19 is mounted on base plate 18 for movement with the latter so as to engage a magnetic tape (not shown) when base plate or carriage 18 is in its active position. Further, a pinch roller (not shown) may be mounted on base plate 18 or otherwise coupled with the latter so as to engage the tape between such pinch roller and a rotated capstan (not shown) when base plate 18 is moved to its active position for forward driving of the tape during a recording or reproducing operation of the tape recorder. A spring 20 is connected to base plate 18 for yieldably urging the latter in the direction of the arrow b to the inactive position of the base plate.

An actuating means for head base plate 18 is shown to include, in addition to cam 5, an actuating lever 22 which is pivotally mounted intermediate its ends, as at 23, and which has one end portion 22a acting as a cam follower and engageable with the peripheral surface of cam 5. The opposite end portion 22b of actuating lever 22 is engageable with a flange 24 on head base plate 18. It will be apparent that the urging of head base plate 18 in the direction of the arrow b by spring 20 serves to angularly bias actuating lever 22 in the counterclockwise direction, as viewed on FIGS. 1 and 2, for urging end portion 22a of the actuating lever against cam 5.

A locking lever 26 is pivotally mounted, at one end, on a pivot pin 27, and is yieldably urged to pivot in the counterclockwise direction on FIG. 1, that is, in the direction of the arrow c, by a spring 28. The pivotal movement of locking lever 26 by spring 28 serves to urge an abutment or pin 29 on lever 26 against a stop surface 30 on head base plate 18. Thus, the position of head base plate 18 determines the position to which lever 26 can be urged by spring 28. Springs 20 and 28 are dimensioned so that the force of spring 20 predominates over the force of spring 28. Accordingly, when actuating lever 22 is in the position shown on FIG. 1 to permit spring 20 to move head base plate 18 in the direction of the arrow b to its inactive position, surface 30 on base plate 18 acts against abutment pin 29 to move locking lever 26 angularly against the force of spring 28 to the position shown on FIG. 1, and in which an armature member 32 mounted by a pin 33 at the free end of locking lever 26 is in a free position spaced from ends 13a and 13b of yoke portion 13. On the other hand, when head base plate 18 is moved in the direction of the arrow a to its active position shown on FIG. 2, spring 28 can then angularly displace locking lever 26 in the direction of the arrow c for moving armature member 32 to a holding position against ends 13a and 13b of yoke portion 13.

When armature member 32 is in its free position shown on FIG. 1, the magnetic resistance of the first magnetic path defined by U-shaped yoke portion 22 is substantially less than the magnetic resistance of the second magnetic path defined by U-shaped yoke portion 13, as earlier noted. However, when armature member 32 is moved to its holding position against ends 13a and 13b of yoke portion 13, a closed magnetic path is defined through armature member 32 and yoke portion 13, and such closed path has a low magnetic resistance substantially less than that of the first magnetic path defined by yoke portion 12.

The above described mode changing apparatus operates as follows:

When the tape recorder is inoperative and in its STOP mode so that no power is supplied to the mode changing apparatus in the condition shown on FIG. 1, the electric motor associated with driving gear 6 is inoperative and solenoid coil 15 is deenergized. Further, in the STOP mode, the toothless gap 2 of changing gear 1 faces driving gear 6 so that gears 1 and 6 are disengaged from ech other, as shown on FIG. 1. Changing gear 1 is stabilized in such position by a magnetic attraction between the south pole S of magnet 4 and the stabilizing portion 16. Thus, changing gear 1 is magnetically stabilized or held in its illustrated initial or STOP position in which driving gear 6 is disengaged from changing gear 1. Such magnetic stabilization is obviously more simply realized than a comparable stabilization by mechanical means. Further, in the stabilized position of changing gear 1, magnet 4 has its north and south poles N and S disposed along a diametric line which is substantially perpendicular to a line connecting ends 12a and 12b of the first yoke portion 12. At such position of magnet 4, its north and south poles N and S are positioned as far as possible from ends 12a and 12b of yoke portion 12. Accordingly, in the stop or initial position of changing gear 1, ends 12a and 12b of yoke portion 12 are affected as little as possible by the magnetizing force of magnet 4.

When the usual power supply switch (not shown) of the tape recorder is turned ON, the motor associated with driving gear 6 is connected to a power source with the result that such motor rotates driving gear 6 in the direction of the arrow d on FIG. 1.

When it is desired to initiate a recording or reproducing operation of the tape recorder, the usual FORWARD button (not shown) of the tape recorder is depressed for actuating a respective switch with the result that an electric current is suitably supplied to solenoid 15 in the direction to generate magnetic flux $\phi_1$ in U-shaped yoke portion 12 (FIG. 3) which provides north and south magnetic poles N and S at ends 12a and 12b. AT this time, as previously mentioned, the magnetic resistance of the second magnetic path defined in yoke portion 13 is substantially greater than the magnetic resistance of the first magnetic path defined in yoke portion 12 since armature member 32 is in its free position spaced from ends 13a and 13b of yoke portion 13. Thus, little magnetic flux is generated in the second magnetic path defined in U-shaped yoke portion 13, and the electric current supply to solenoid 15 is substantially fully utilized for generating the desired magnetic flux $\phi_1$ in yoke portion 12.

Furthermore, if magnet 4, when in its initial position in the STOP mode of the tape recorder, had its south and north poles S and N disposed close to ends 12a and 12b of yoke portion 12, then the ends 12a and 12b could be relatively strongly magnetized with south and north polarity, as indicated at S' and N', respectively, on FIG. 1. In that case, a relatively large electric current would have to be supplied to solenoid coil 15 for increasing the density of the magnetic flux $\phi_1$ so that the latter would be sufficient to reverse the polarity of magnetization at ends 12a and 12b of yoke portion 12 from the initial south and north polarities S' and N' shown on FIG. 1 to the desired north and south polarities N and S shown on FIG. 3. However, in the initial stabilized position of changing gear 1 and magnet 4, the south and north poles S and N of magnet 4 are positioned as far as possible from ends 12a and 12b of yoke portion 12 so that the magnetizing force of magnet 4 will affect such ends 12a and 12b as little as possible. Therefore, there is no need to reverse the polarity of magnetization at ends 12a and 12b, and the desired north and south polarities N and S at ends 12a and 12b, respectively, can be achieved with only a relatively small current being supplied to solenoid coil 15. From th foregoing, it will be appreciated that the mode changing apparatus according to this invention is efficient in its consumption of electric power so as to be well suited for incorporation in a battery powered or portable tape recorder.

Figure 3:
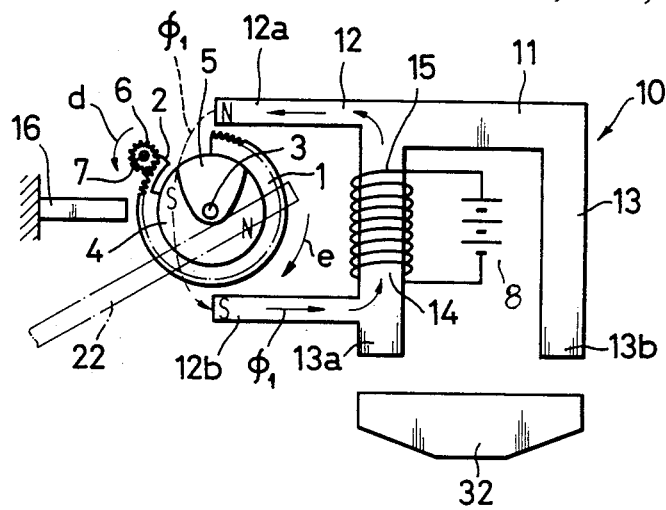
FIGS. 3 and 4 are fragmentary plan views corresponding to a portion of the structure shown in FIGS. 1 and 2, and illustrating other phases of the operation of the mode changing apparatus to which reference will be made in explaining such operation.
Figure 4:
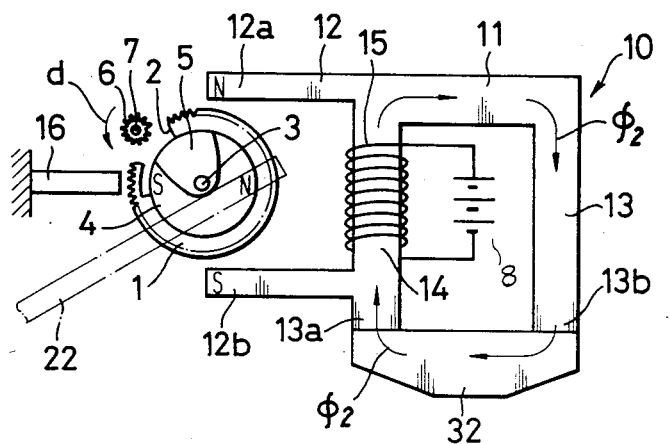

When ends 12a and 12b of yoke portion 12 are magnetized to have north and south polarities N and S, respectively, the south and north poles of magnet 4 are magnetically attracted toward ends 12a and 12b, respectively, of yoke portion 12 and simultaneously magnetically repelled from ends 12b and 12a, respectively, so that a rotative force or torque in the direction of the arrow e on FIG. 3 is applied to magnet 4 and changing gear 1. Such rotative force triggers the movement of changing gear 1 in the direction of arrow e and brings its peripheral teeth immediately into engagement with rotated driving gear 6. Thereupon, the turning of changing gear 1 in the direction of arrow e is continued in response to the rotation of gear 6 by the associated electric motor until changing gear 1 completes a full revolution and returns to its initial position in which toothless gap 2 again faces driving gear 6 for disengaging driving gear 6 from changing gear 1, as shown on FIG. 4.

In the course of the turning of changing gear 1 in the direction of arrow e from the position shown on FIG. 3, cam 5 is turned with changing gear 1 so as to bring its radially high surface 5a into engagement with end portion 22a of actuating lever 22 for rocking the latter in the direction of the arrow f on FIG. 2. The rocking of actuating lever 22 in the direction of the arrow f causes end portion 22b to bear against flange 24 of head base plate 18 and to move the latter in the direction of the arrow a to its active position against the force of spring 20. Due to such movement of head base plate 18 to its active position, head 19 is brought into contact with the magnetic tape and the pinch roller (not shown) is pressed against the associated capstan with the result that the FORWARD mode of the tape recorder is established for the performance of a recording or reproducing operation.

During the described movement of head base plate 18 in the direction of the arrow a to its active position, surface 30 tends to move away from abutment pin 29 and spring 28 is effective to turn locking lever 26 in the direction of the arrow c on FIG. 2. As a result of such movement of lever 26, armature member 32 is moved from its free position (FIGS. 1 and 3) to its holding position (FIGS. 2 and 4) in which armature member 32 is in close abutting relation to ends 13a and 13b of yoke portion 13. When armature member 32 is brought to such holding position, a closed magnetic path is defined in yoke portion 13 and armature member 32, and such closed magnetic path has a magnetic resistance which is smaller than that of the first magnetic path defined in yoke portion 12. Consequently, as shown on FIG. 4, the flow of magnetic flux in yoke portion 12 indicated at $\phi_1$ on FIG. 3 is reduced to a minimum, and magnetic flux $\phi_2$ flows strongly in the closed magnetic path defined by yoke portion 13 and abutment member 32, thereby providing what is, in effect, a magnetic switching effect. In other words, the magnetic flux due to the supplying of electric current from voltage source 8 to solenoid coil 15 is switched from a magnetic path in yoke portion 12 to a closed magnetic path in yoke portion 13 and armature member 32 as a result of the turning of cam 5 to the position shown on FIG. 2 and the consequent movement of the operating member or head base plate 18 to its active position. After such magnetic switching effect has occurred, that is, after the magnetic flux $\phi_1$ in yoke portion 12 has been substantially minimized, the rotative force or torque acting on changing gear 1 due to the interaction of magnetic flux $\phi_1$ with magnet 4 is substantially eliminated and changing gear 1 is free to be further rotated by driving gear 6 until changing gear 1 returns to its initial position and is disengaged from gear 6, as shown on FIG. 4. Upon return of changing gear 1 to its initial position, yoke portion 16 again cooperates with the south pole S of magnet 4 for stabilizing changing gear 1 in such initial position. Further, upon the return of changing gear 1 to its initial position, and for so long as solenoid coil 15 remains energized, armature member 32 continues to be magnetically attracted to ends 13a and 13b of yoke portion 13 and remains in its holding position. While armature member 32 is magnetically retained in its holding position, the abutment pin 29 on locking lever 26, by its engagement with surface 30 on head base plate 18, locks or holds base plate 18 in its active position against the return force of spring 20 even though the radially high surface 5a of cam 5 no longer engages end portion 22a of actuating lever 22. It will be appreciated that, since the magnetic flux $\phi_2$ flows in a closed magnetic path when armature member 32 is in its holding position, even a small electric current supplied to solenoid coil 15 will be sufficient to provide a substantial magnetic force for retaining armature member 32 in its holding position. Further, it will be appreciated that the movement of armature member 32 from its free position (FIG. 3) to its holding position (FIG. 4) is, for the most part, effected mechanically, that is, by the action of spring 28 on locking lever 26 as head base plate 18 is mechanically moved to its active position. Thus, the magnetic flux generated by solenoid coil 15 does not need to be large enough to attract armature member 32 from its free position to its holding position against the ends of yoke portion 13. In other words, the electric current supplied to solenoid coil 15 need only be large enough to provide the magnetic flux $\phi_2$ in a closed magnetic path which is sufficient to retain armature member 32 in its holding position against yoke portion 13, but need not be so large as to attract or move the armature member 32 against yoke member 13 from a free position spaced from the latter. Accordingly, there is no time during the operating cycle of the illustrated mode changing apparatus when it is necessary to supply a large electric current to solenoid coil 15, nor is it necessary to provide a complicated switching mechanism for varying the magnitude of the electric current supplied to coil 15 at various stages of the operating cycle as would be the case if a large current were supplied to provide a magnetic force sufficient to attract the armature member from its free position to the holding position and then the current was reduced to merely retain the armature member in its holding position.

With the return of changing gear 1 to its initial position (FIG. 4), the operations of the illustrated mode changing apparatus for establishing the FORWARD mode of the tape recorder are completed with the head base plate 18 locked or held in its active position so long as armature member 32 is retained in its holding position against yoke portion 13. Thereafter, when the usual STOP button is depressed, the supplying of electric current to solenoid coil 15 is suitably interrupted and armature member 32 is released from its holding position against yoke portion 13. Thereupon, spring 20 is free to return head base 18 in the direction of arrow b to its inactive position shown on FIG. 1. During such movement of head base plate 18 in the direction of the arrow b, surface 30 on plate 18 acts against abutment pin 29 for pivoting locking lever 26 against the force of spring 28 and returning armature member 32 to its free position shown on FIG. 1.

It will be appreciated that, in the mode changing apparatus described above, the locking of head base plate 18 in its active position is electrically controlled, that is, the locking of head base plate 18 in its active position is dependent upon the supplying of electric current to solenoid coil 15 for retaining armature member 32 in its holding position. Therefore, the locking of the mechanism in the condition for establishing the FORWARD mode can be easily released for returning the mechanism to the STOP mode merely by interrupting the supplying of current to coil 15, and this is particularly advantageous in the case of remote control of the tape recorder operations. Further, since the changeover from the STOP mode to the FORWARD mode, or from the FORWARD mode to the STOP mode, is achieved merely by energizing or deenergizing coil 15, it is apparent that such change-over can be controlled simply by suitable push-button operated switches of the feather-touch type.

Figure 5:
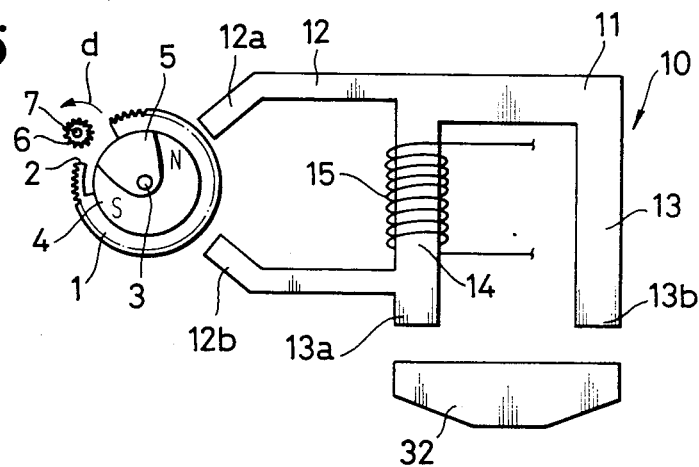
FIG. 5 is a fragmentary plan view corresponding to a portion of FIG. 1, and showing a mode changing apparatus according to another embodiment of this invention.

Referring now to FIG. 5, it will be seen that, in a mode changing apparatus according to another embodiment of this invention which is otherwise similar to the embodiment described above with reference to FIGS. 1–4, the yoke portion 16 for stabilizing magnet 4 and changing gear 1 in the initial position of the latter is omitted, and ends 12'a and 12'b of yoke portion 12 are angled toward each other so as to be angularly displaced from each other by approximately 90° about the axis of shaft 3. Further, the end 12'a of yoke portion 12 is shown to be substantially closer than end 12'b to the center of rotation of magnet 4 on shaft 3. In the embodiment of FIG. 5, the diametrically opposed poles N and S of magnet 4 are shown to be angularly positioned in respect to the toothless gap 2 of changing gear 1 so that, in the initial position of changing gear 1 in which toothless gap 2 faces driving gear 6, the north pole N of magnet 4 is near to the relatively closely disposed end 12′a of yoke portion 12. The resulting magnetic attraction between such north pole N and end 12′a of yoke portion 12 serves to magnetically stabilize changing gear 1 in its initial position. It will be appreciated that, apart from the foregoing manner in which changing gear 1 is stabilized in its initial position, the mode changing apparatus of FIG. 5 will operate in substantially the same manner as the apparatus according to this invention described with reference to FIGS. 1–4.

Although the invention has been described in detail with reference to a mode changing apparatus capable of selectively establishing the FORWARD and STOP modes of a tape recorder, it will be appreciated that the invention may be similarly applied to mode changing apparatus for changing-over between various other operating modes, such as, the usual FAST-FORWARD, REWIND, REVERSE and PAUSE modes. In such other applications of the invention, it is only necessary to suitably interconnect the actuating lever 22 controlled by cam 5 with a suitable operating member of a respective mode changing apparatus.

Although illustrative embodiments of this invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A mode changing apparatus for a tape recorder comprising:
   a rotatable changing gear having a toothed periphery with a toothless gap therein;
   a magnet rotatably coupled with said changing gear for rotation with the latter;
   a driving gear rotatably mounted adjacent said changing gear and being engageable with said toothed periphery for driving the changing gear when the latter is displaced from an initial position in which said toothless gap faces said driving gear to disengage said toothed periphery from said driving gear;
   yoke means for directing magnetic forces generated therein and having portions extending adjacent to said magnet;
   a solenoid coil wound on another portion of said yoke means and being operative, when energized, to generate magnetic forces in said yoke means by which said magnet and changing gear are angularly rotated from said initial position for engagement of said toothed periphery by said driving gear to cause turning of said changing gear;
   an operating member movable from an inactive position to an active position for establishing a respective mode for the tape recorder;
   yieldable means urging said operating member to return from said active position to said inactive position;
   actuating means responsive to said turning of said changing gear by said engagement of the toothed periphery with said driving gear for moving said operating member from said inactive position to said active position; and
   armature means for selectively holding said operating member at said active position upon being moved from a free position spaced from said yoke means to a holding position against the latter in response to the movement of said operating member from said inactive position to said active position, said yoke means and solenoid coil being operative, when the latter is energized, to magnetically hold said armature means in said holding position at which said operating member is held against return from said active position to said inactive position by said yieldable means.

2. A mode changing apparatus as in claim 1; in which said actuating means includes a cam rotatable with said changing gear, and a cam following member engageable with said cam and with said operating member for moving the latter to said active position in response to turning of said cam with said turning of said changing gear.

3. A mode changing apparatus as in claim 1; in which said yoke means includes a first substantially U-shaped portion defining a first magnetic path for generation of said magnetic force by which said magnet and changing gear are angularly displaced from said initial position, and a second substantially U-shaped portion defining a second magnetic path having a magnetic resistance greater than that of said first magnetic path when said armature means is in said free position and against which said armature means is held in said holding position of the latter to convert said second magnetic path to a closed path of low magnetic resistance.

4. A mode changing apparatus as in claim 3; in which said other portion of the yoke means on which said solenoid coil is wound is common to said first and second U-shaped portions.

5. A mode changing apparatus as in claim 3; in which said first U-shaped portion of the yoke means has opposite ends disposed adjacent said magnet.

6. A mode changing apparatus as in claim 5; in which said magnet has oppositely magnetized poles which are diametrically opposed to each other.

7. A mode changing apparatus as in claim 6; further comprising stabilizing means operative to yieldably resist turning of said changing gear from said initial position.

8. A mode changing apparatus as in claim 7; in which said stabilizing means includes a portion of said yoke means cooperating with said magnet.

9. A mode changing apparatus as in claim 8; in which said portion of the yoke means included in said stabilizing means is disposed adjacent said magnet at a position intermediate said ends of said first U-shaped portion and is separate from said first and second U-shaped portions and said portion no which the solenoid coil is wound.

10. A mode changing apparatus as in claim 8; in which one of said ends of said first U-shaped portion of the yoke means is closer to said magnet than the other of said ends for attracting one of said poles of the magnet and thereby constituting said portion of the yoke means included in said stabilizing means.

11. A mode changing apparatus as in claim 10; in which said ends of said first U-shaped portion of the yoke means are angled toward each other so that said other end is angularly displaced by approximately ninety degrees from said one end in respect to the axis of rotation of said magnet.

12. A mode changing apparatus as in claim 1; in which said operating member is a head base plate of a tape recorder, and said yieldable means is a first spring connected with said head base plate and urging the latter in the direction toward said inactive position; and in which said actuating means includes a cam rotatable with said changing gear, and an actuating lever having a cam following portion at one end engageable with said cam and an opposite end portion engaging said head base plate.

13. A mode changing apparatus as in claim 12; in which said armature means includes an armature member through which a closed magnetic path is formed with said yoke means in said holding position, and a locking lever carrying said armature member and having an abutment engageable against said head base plate so that said abutment member can move to said holding position only when said head base plate is moved to said active position.

14. A mode changing apparatus as in claim 13; in which a second spring is connected with said locking lever for urging the latter in the direction moving said armature member toward said holding position; and the force of said first spring predominates over the force of said second spring.

* * * * *